Figure 3:
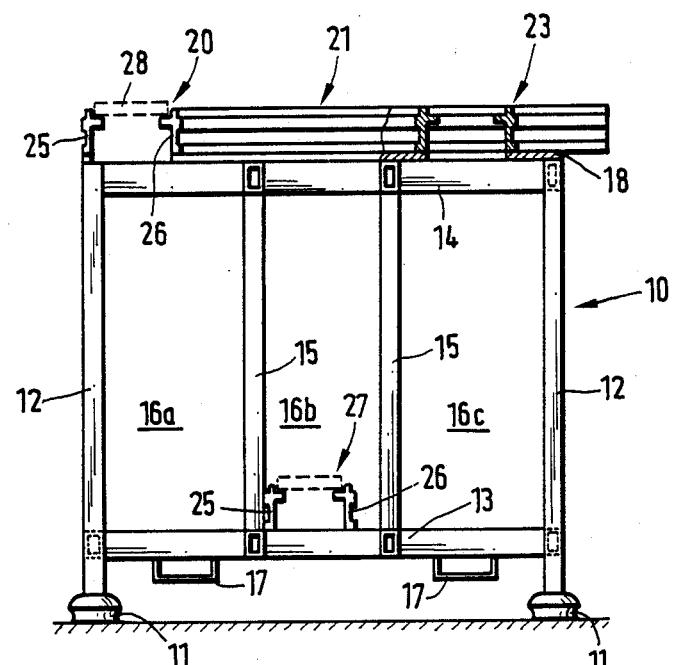

United States Patent [19]

Blöcker

[11] Patent Number: 4,917,226
[45] Date of Patent: Apr. 17, 1990

[54] DUPLEX-CONVEYER

[75] Inventor: Detlef Blöcker, Königswinter, Fed. Rep. of Germany

[73] Assignee: Protech Automation GmbH, Cologne, Fed. Rep. of Germany

[21] Appl. No.: 237,800

[22] Filed: Aug. 29, 1988

[51] Int. Cl.⁴ .............................................. B65G 21/20
[52] U.S. Cl. ................................ 198/345; 198/346.1; 198/465.3; 198/817; 198/861.1
[58] Field of Search ............................ 198/345–346.1, 198/465.1–465.3, 803.2, 817, 861.1, 414; 29/33 P, 563

[56] References Cited

U.S. PATENT DOCUMENTS

| 3,825,108 | 7/1974 | Stone | 198/861.1 |
| 3,931,882 | 1/1976 | Ossbahr | 198/803.2 |
| 4,556,143 | 12/1985 | Johnson | 198/817 |

FOREIGN PATENT DOCUMENTS

| 3513381 | 10/1986 | Fed. Rep. of Germany | 198/414 |
| 143805 | 8/1984 | Japan | 198/817 |
| 7113 | 1/1986 | Japan | 198/817 |
| 169406 | 7/1986 | Japan | 198/817 |

Primary Examiner—Joseph E. Valenza
Attorney, Agent, or Firm—Diller, Ramik & Wight

[57] ABSTRACT

A duplex conveyor includes two generally parallel longitudinal profiles adapted to support a conveyor thereupon with each profile including an upright stem, a leg projecting generally transversely from an inner side of each upright stem and carrying a vertical clamping bar, and a retaining strip projecting generally transversely from an outer side of each upright stem. Each retaining strip has an exterior longitudinally inclined surface disposed in inclined relationship to a longitudinal plane of its associated upright stem and a clamping block is carried thereby and is locked in position by a screw which bears against the inclined surface. In addition, a clamping bar projects generally transversely from the inner side of each upright stem and carries a mechanism for manipulating an associated pallet of the conveyor.

16 Claims, 7 Drawing Sheets

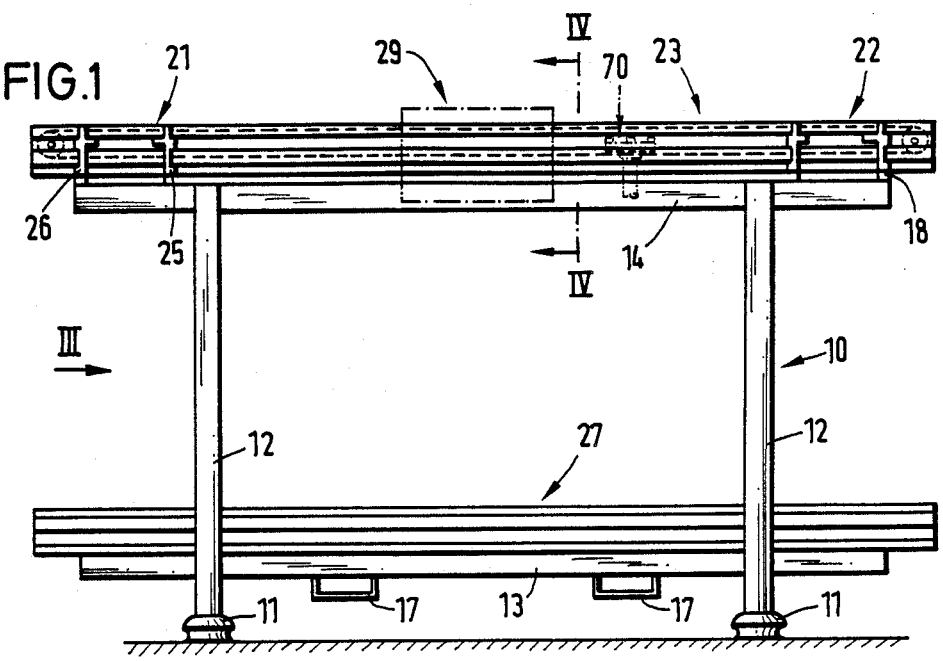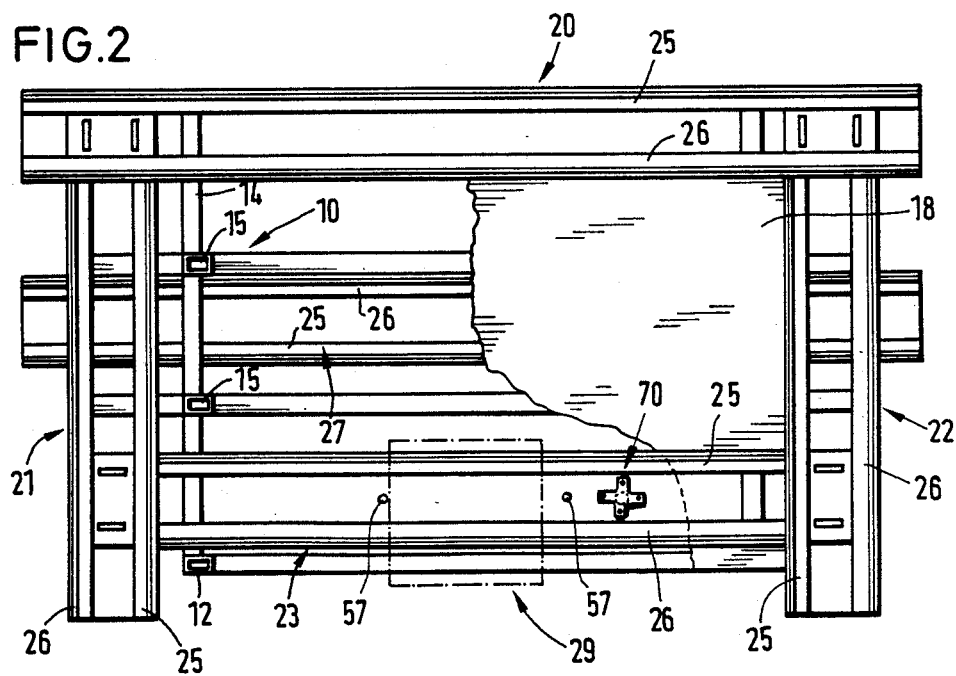

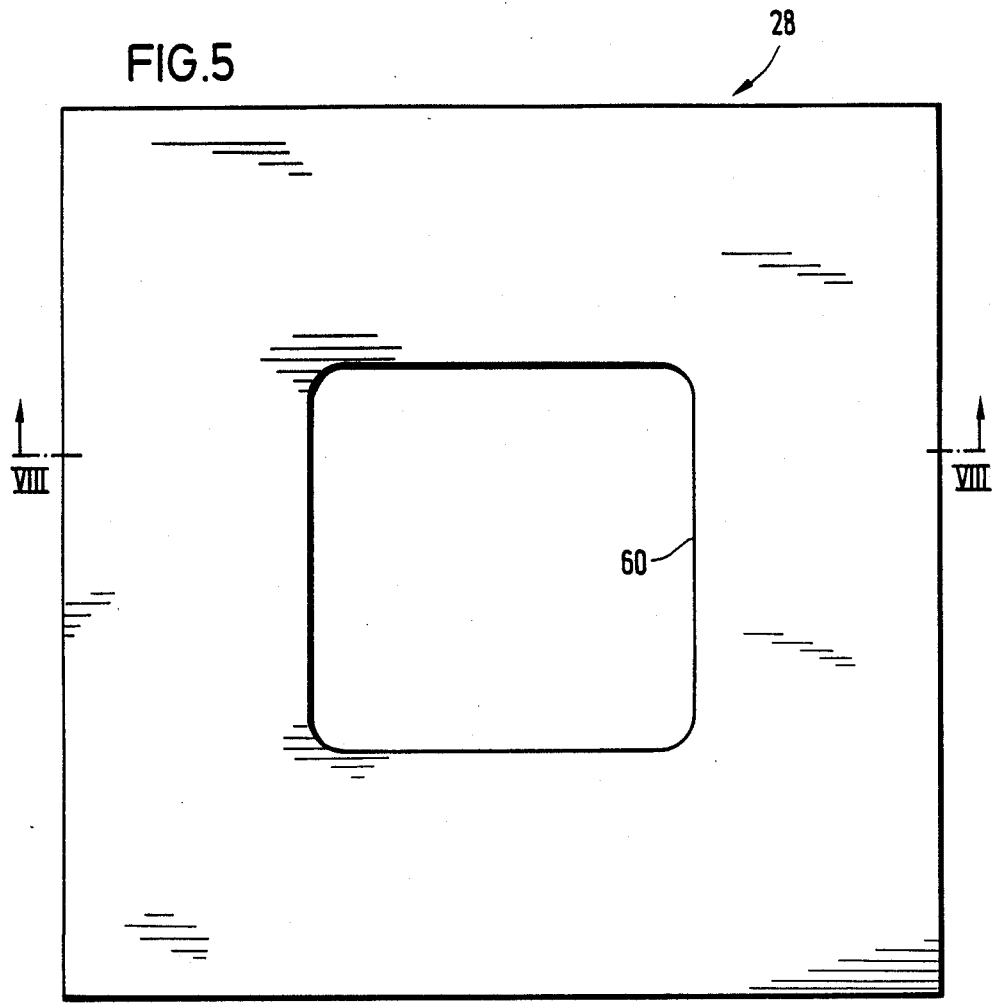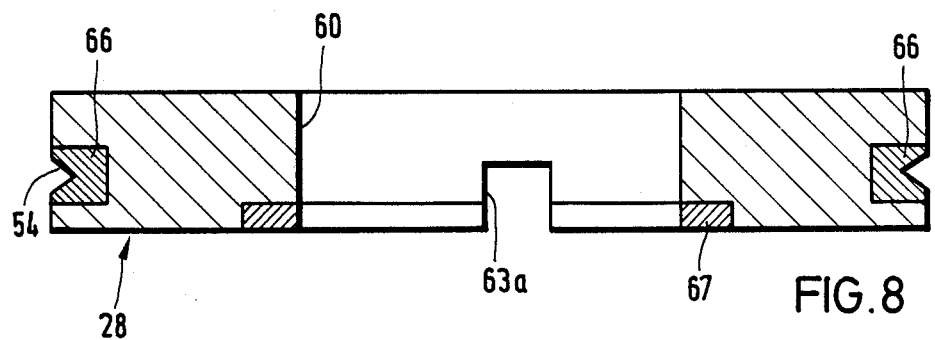

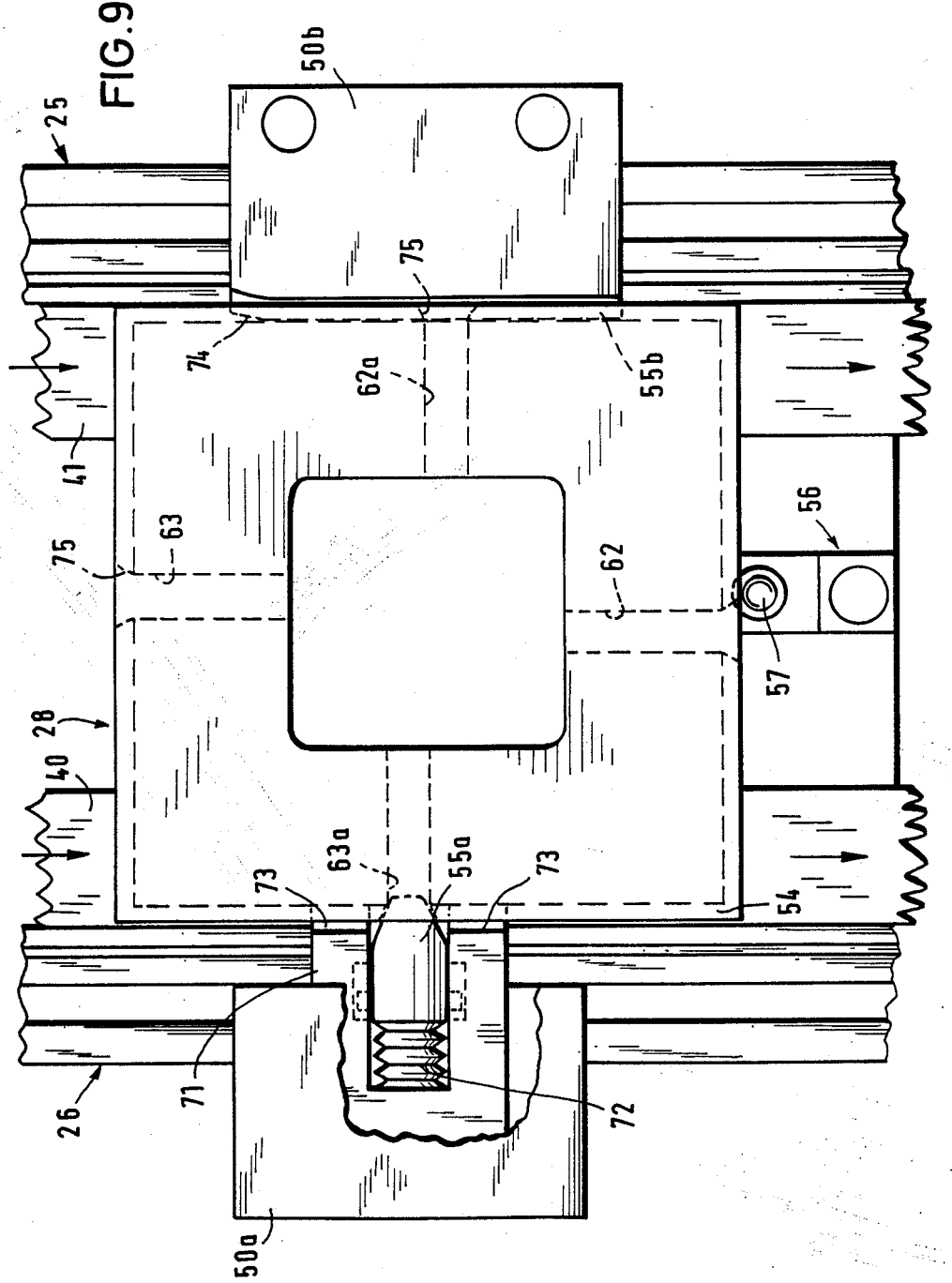

DUPLEX-CONVEYER

The invention relates to a duplex conveyer.

For manufacturing equipment, in particular assembly lines, use has been made of duplex conveyers comprising two parallel conveyer belts on which pallets are placed to convey workpieces between handling positions of which one or a plurality may be provided in the course of the duplex conveyer. At said positions, the pallet is arrested, lifted locally and stopped while the belt conveyer further moves forward beneath the pallet. The known conveyer and handling systems are individually constructed and assembled in accordance with the respective requirements. To this effect, modular designs including specific profiles and corner brackets may be used. A specific problem is involved with the separation of the pallets conveyed in close succession on the belt conveyer. If one of said pallets is dismissed from the handling station, the following pallets which, before, were slidingly retained on the moving conveyer belts have to be advanced by one pallet length. Said stepwise advance by exactly one pallet length entails difficulties because it is practically impossible to selectively engage by means of a stop member the gap between two successive pallets.

The known duplex belt conveyers imply another difficulty in that auxiliary members such as clamping means, proximity switches, keys etc. may be mounted only with an extensive assembly work and that it is difficult to equip the handling stations with components provided to this effect and including also the separating means.

Finally, it is another handicap that conveyer lines of a manufacturing plant have to be tailored individually to the prevailing needs and that, up to the present, it has been impossible to simply intercombine handling units which may be separately prefabricated as modules, because expensive assembly works were always necessary for joining them conveniently.

It is an object of the invention to provide a duplex conveyer of the type which offers the possibility of designing by simple means the handling stations and their versatile outfit.

A first solution of the problem includes a pallet which is arrested by its front side abutting against a lifted pin. The guide groove ending in the front side is so provided that it is not situated on the longitudinal line on which the pin is arranged so that said pin does not match with the front groove. Hence, the pallet may only pass over the pin if it is in lowered condition. Thus, the front edge of the pallet is used for the separation or retention of the pallets. As soon as part of the pallet has passed the lowered pin, the latter may be already lifted again without colliding with any parts of the pallet. Only the front edge of the next pallet will be stopped by the lifted pin. Due to the lateral mismatch of the two guide grooves, the pallet may be used in the same way when it is turned by 180°.

Preferably, two pairs of guide grooves are provided which are offset mutually at right angles. In such a case, the pallet may be also used in being turned by 90° or, without changing its orientation, it may be passed on from a first conveyer to a subsequent second conveyer whose conveying direction is rectangular to that of the first conveyer.

In another preferred embodiment of the invention the equipment carries two conveyer units and corresponding profiles.

The clamping bar is integrally formed with the contact surfaces of the profiles. As a result thereof, at any optional site of the conveyer line, additional means such as proximity initiators, switches or the like may be mounted and simply adjusted beneath the pallet path, e.g. to operate the pin of the separation means or to cause the lifting of the pallet from the conveyer elements. At the retainer strip provided at the outside of the stem, the clamping block for lifting and retaining the pallet may be fixed interchangeably by simple clamping or tensioning means and it may be adjusted or exactly positioned accordingly.

Suitably, the profiles forming the carrying elements of the duplex conveyer are mounted on a support. A plurality of such supports of which each comprises at least a complete conveyer may be composed to form a manufacturing plant, wherein the conveyers of different supports are either mutually aligned or positioned at right angles with respect to each other. Thus, due to the duplex conveyer of the invention, different manufacturing or handling systems may be combined of several modular units of which each includes at least one independent conveyer.

Figure 4:
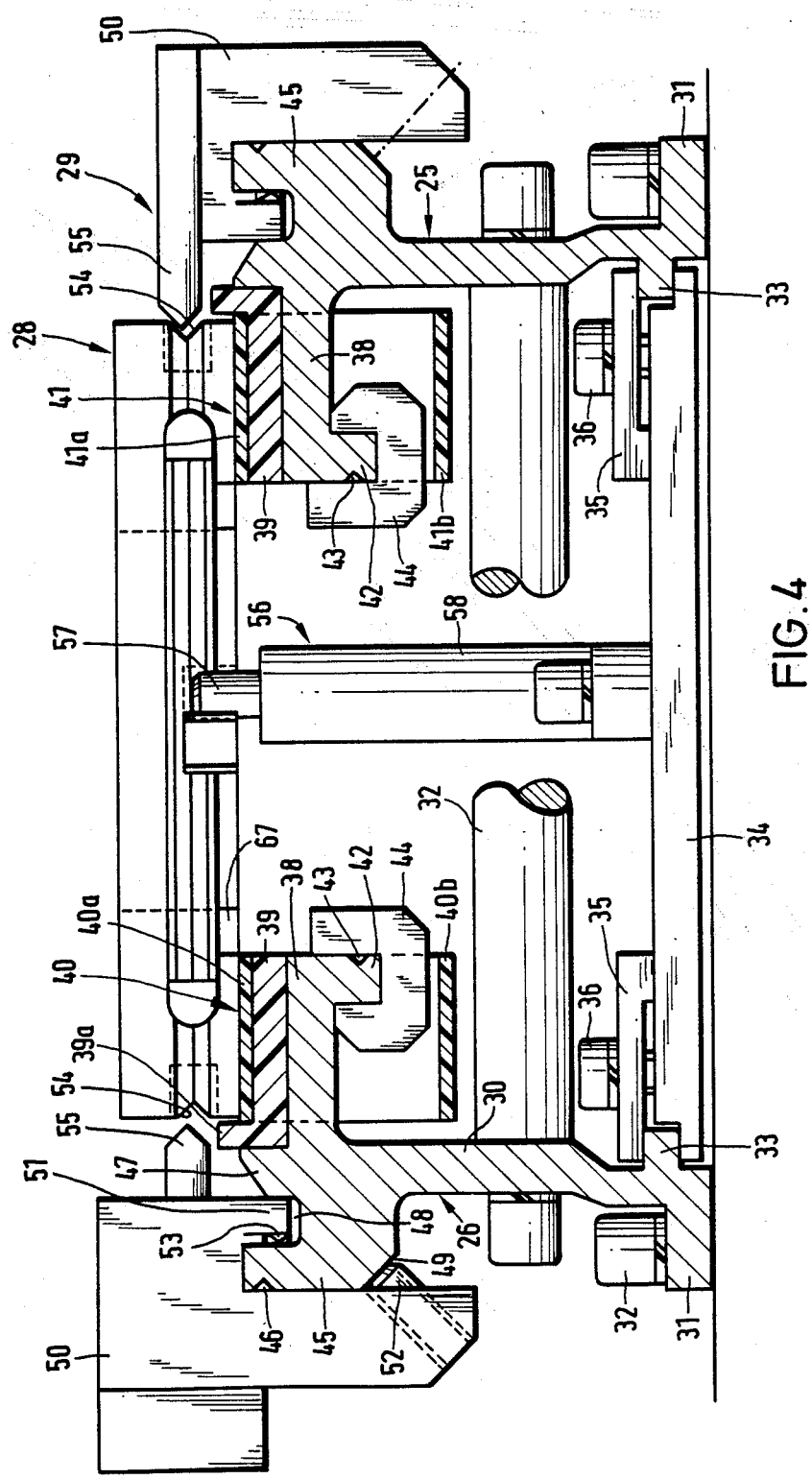
Figure 6:
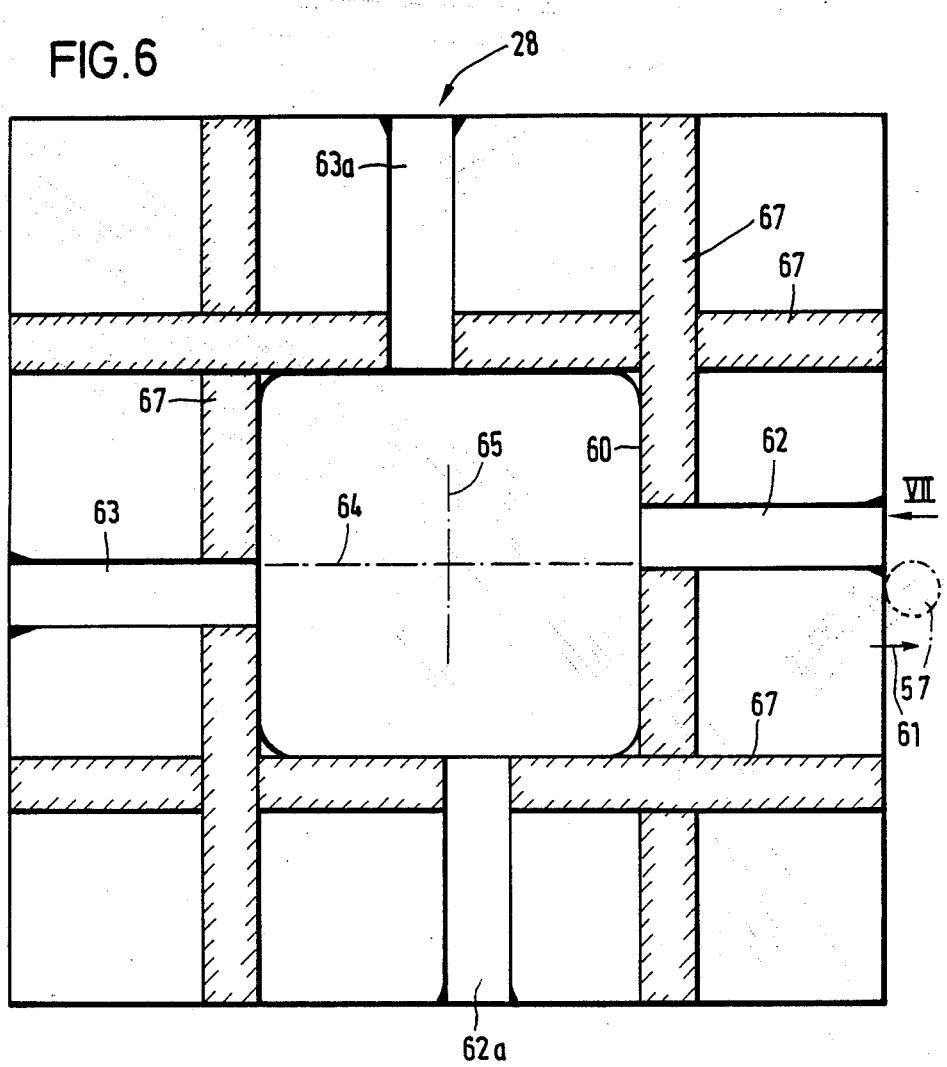
Figure 7:
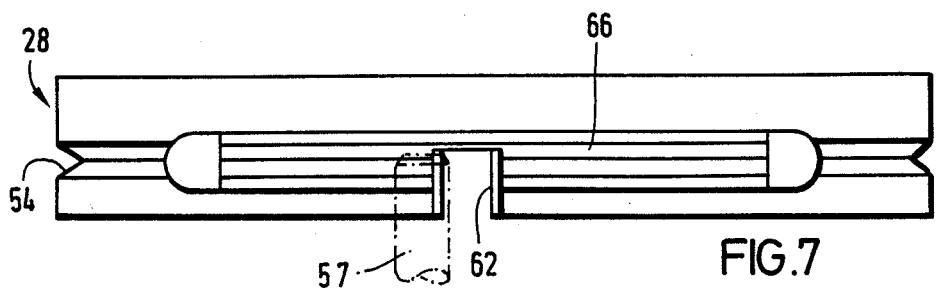
Figure 10:
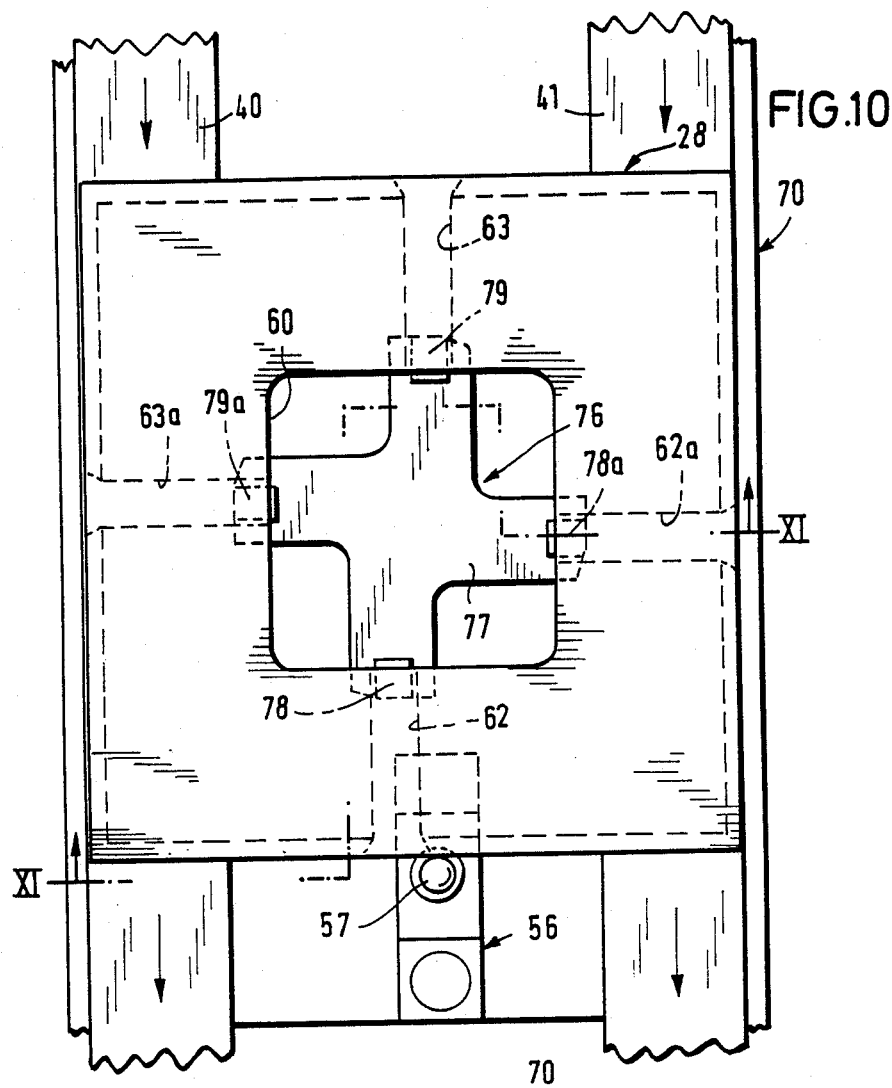
Figure 11:
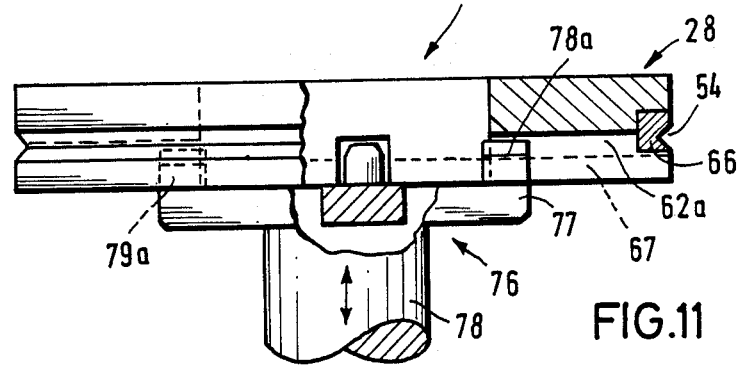

An embodiment of the invention will be now explained in more detail with reference to the drawings in which FIG. 1 shows a side view of a support with profiles for the formation of belt conveyers, FIG. 2 is plan view of the support of FIG. 1 including five belt conveyers in total, FIG. 3 is a view of the support of FIG. 1 from the direction of arrow III, FIG. 4 is an end view of the handling station in the form of a section along line IV—IV of FIG. 1, FIG. 5 is a plan view of a pallet, FIG. 6 is a bottom view of the pallet of FIG. 5, FIG. 7 is a view of the pallet from the direction of arrow VII of FIG. 6, FIG. 8 is a section along line VIII—VIII of FIG. 5, FIG. 9 is a plan view of the handling station of FIG. 4, FIG. 10 is a plan view of a turning station for turning a pallet in both senses by 90°, FIG. 11 is a section along line XI—XI of FIG. 10.

The support 10 shown in FIGS. 1 to 3 constitutes the basic unit of a universal manufacturing assembly forming part of a manufacturing plant, said support comprising four upright columns 12 positioned on the ground by feet 11 and being interconnected by a horizontal lower frame 13 and a horizontal upper frame 14. In the end sides of support 10 between column 12, there extend two vertical bars 15 subdividing the interior of the support into three juxtaposed compartments 16a, 16b, 16c. The lower frame 13 is provided with sleeve elements 17 welded thereto for gripping or seizing frame 14 by the forks of a fork lifter, of an industrial trucks or the like. In longitudinal direction, the rectangular upper frame 14 and the rectangular lower frame 13 protrude horizontally beyond the columns 12 (FIG. 1).

On the upper frame 14 of support 10, there is fixed a table plate 18 with T-shaped grooves which serve as a fixation element for devices and handling means, and as a working plate, a plate of deposit, and an assembly plate. On the table plate, there are arranged four horizontal belt conveyers 20, 21, 22 and 23 forming a rectangle. The belt conveyer 20 moving lengthwise forms a main transport line while the three other belt conveyers 22, 23 and 21 form a bypass transport line. FIGS. 1 to 3 only show the two stationary profiles 25,26 of each belt conveyer for guiding the two conveyer belts, which, as such, as well as the auxiliary and additional means are not illustrated for the sake of clarity.

The two conveyers 20 and 23 are mounted above the two outer compartments 16a and 16c, while, in the central compartment 16b, on the lower frame 13, a return movement conveyer 27 is fixed. All of the belt conveyers 20,21,22,23 and 27 are of an equal design which, based on belt conveyer 23, will be still explained hereunder in more detail The belt conveyers are used to transport the pallets 28 shown in FIGS. 5 to 8 on which pallets a corresponding take-up for fixing tools is fastened. In the course of the belt conveyer 23, there is provided a processing station 29 at which the pallets conducted via the bypass transport line, may be arrested individually in order to carry out treating, mounting or other operations at the workpieces. In advance of the handling station 29, a turning station 70 permits to turn the pallets by 90° in a horizontal plane.

The embodiment of profiles 25 and 26 is evident from FIG. 4 showing that each profile contains an upright stem 30 whose lower end has an outwardly projecting flange 31 secured by screws to plate 18 or to another support. From stem 30, a clamping bar 33 extends horizontally towards the inside, said bar being somewhat higher than flange 31 and being underengaged by the transverse rail 34 extending between both profiles 25 and 26 at whose clamping bars 33 it is clamped by shims 35 and screws 36. If the ends of the rail 34 underengage the clamping bars 33, such as illustrated in FIG. 4, the shims 35 overengage the clamping bars 33. It is also possible to cause rail 34 to press from above against the clamping bars 33, while, if so, the shims 35 press from below against them.

A transverse shaft 37 extends between stems 30 of the two profiles 25 and 26 to keep said rails in the desired mutual spaced relationship. The ends of shaft 37 are fixed by screws with profiles 25 and 26.

Near the upper end of each stem 30, a running board 38 projects inwardly from said stem, in other words, the ends of said running boards 38 are confronted with each other. The top side of the running board 38 is provided with a coating forming the slide face 39 for the upper half 40a or 41a of the conveyer belt 40 or 41. The lower half 40b or 41b extends at a vertical distance beneath the appertaining running board 38 above shaft 37.

From the inner end of each running board 38, a clamping bar 42 projects downwardly, said clamping bars 42 having triangular grooves 43 at their confronted vertical surfaces. To each clamping bar 42, additional elements such as switches, proximity initiators etc. may be secured by clamps 44, at an optional site of the profile length. Clamps 44 enclose the clamping bar 42 in a U-shaped manner, and they are fixed by a screw whose point penetrates into groove 43. The clamps 44 are placed from below on the clamping bar 42.

In the vicinity of the upper end of stem 30, an L-shaped retaining strip 45 extends outwardly in opposite direction to the running board 38. The outside of the upwardly extending outer leg of the retaining strip 45 contains a V-shaped groove 46. Said leg together with the upper end 47 of stem 30 forms a vertical groove 48.

The external lower edge of the retaining strip 45 forms an inclined plane 49. At the inside of end 47 of stem 30, there protrudes the external leg 39a of the sliding surface 39, said leg 39a thus forming a lateral limitation for the upper belt half 40a or 41a and a lateral boundary for the pallet 28.

The L-shaped retaining strip 45 serves for the fixation of a clamping block 50 penetrating with a downwardly projecting nose 51 into groove 48 and overengaging the vertical leg of holding bar 45. In the vicinity of the lower end of the clamping block 50, there is seated a lamping screw 52 in a thread bore pointing obliquely upwardly. The front end of said clamping screw 52 rectangularly urges against the inclined surface 49 thus tightening the clamping block 50 at the retaining strip 45. The nose 51 of the clamping block 50 is provided with a leaf spring 53 pressing the clamping screw 52 against the inclined surface 49 thus excluding the risk that the clamping screw 52 is unscrewed unintentionally by vibrations or the like.

The two profiles 25 and 26 are of a complementary design. The end of each profile is provided with (non-illustrated) guide rolls in order to reroute the appertaining conveyer belt 40 or 41. One of said guide rolls is driven.

Each clamping block 50 includes a pin 55 adapted to be moved out towards the side face of the pallet 28 and whose point may penetrate into a V-groove 54 in the vertical side edge of pallet 28. As evident from FIG. 4, pins 55 are somewhat higher than the V-grooves 54. If pins 55 are approached towards each other to penetrate into the V-grooves 54, they slightly lift the pallet 28 from the conveyer belts 40 and 41 so that the conveyer belts travel on while the pallet is arrested.

To arrest the pallet 28 in the desired position at handling station 29, a separating means 56 fixed to rail 44 is provided at said handling station, the separating means 56 including a plug 57 arranged between the conveyer belts 40 and 41 beneath the travel path of the pallets, it being possible to advance said plug 57 out of a housing 58 into the transport path so that the front edge of the pallet abuts against it. As soon as the pallet front edge has reached said plug 57, the pins 55 are moved out in order to lift the pallet from the duplex belt conveyer comprising the two conveyer belts.

As shown in FIGS. 5 to 8, the pallet 28 is square-shaped, its central region having a vertically continuous opening 60. The underside of the pallet is provided with two guide grooves 62,63 extending in conveying direction 61 of which guide groove 62, in the front portion, extends from the front edge to recess 60 while guide groove 63 extends from recess 60 to the rear edge. Said guide grooves 62 and 63 are not situated along a common axis, but with respect to the longitudinal center axis 64, guide groove 62 is offset in one direction, while guide groove 63 is offset by the same distance in the counter direction with respect to the longitudinal center axis 64. Plug 57 arranged such as to be on the path of the rearward guide groove 63, is unable to engage the front guide groove 62. If plug 57 is lifted, the front edge of the pallet abuts against it. If the plug is lowered, the pallet may move with the conveyer belts. If recess 60 is above plug 57, the latter may be lifted without hindering the further travel of pallet 28 because, subsequently, said plug slides through guide groove 63. The next pallet is again arrested by plug 57 such as disclosed above.

Due to the disclosed arrangement of the guide grooves 62,63 and of plug 57 of the separating means, the pallet 28 may be rotated by 180° to be operated in different travel directions accordingly. Another pair of guide channels 62a, 63a provided at right angles to guide channels 62 and 63 is mounted, with respect to the transverse axis 65, just like guide grooves 62, 63 with respect to the longitudinal axis 64. Therefore, without being turned, pallet 28 may be passed on from a first belt conveyer to a second belt conveyer extending rectangularly thereto and being provided with a similar separating means.

As obvious from FIGS. 7 and 8, the pallets 28 made of die cast metal or plastics comprise hardened and ground steel gibs 66 inserted at their vertical side faces in which extend the V-grooves 54. Due to said steel gibs 66, wear and damages of the pallets caused by the plugs 57, the pins 55 and similar elements shall be avoided.

Further, at the pallet underside, there are longitudinal and transverse signal strips 67 of ferromagnetic material which may be hardened and ground and to which the inductive switches fixed to clamps 44 are responsive so that, subject to the position of the pallet, switching or control operations may be performed.

FIG. 9 shows a plan view of a handling station which, while substantially corresponding to FIG. 4, is slightly modified. The front edge of pallet 28 whose lateral areas rest on the conveyer belts 40 and 41 abuts at the handling station against the already mentioned plug 57 arresting said pallet and, simultaneously, ensuring a coarse positioning. The fine positioning is effected by pin 55a whose tapered end penetrates into the end of groove 63a of pallet 28 which is exactly positioned in conveying direction accordingly. Positioning pin 55a is guided in a slide 71 mounted in the clamping block 50a to be displaceable transversely to the conveying direction of the pallets. Seen in plan view, the slide 71 is fork-shaped, and between its legs, the positioning pin 55a is displaceable and by a spring means 72, it is supported in direction of the transport path of the pallets. The front ends of the two legs of the slide 71 are designed as pointed blades 73 which may penetrate into the lateral V-groove 54 of the pallet.

While it is up to pin 55a to position the pallet in longitudinal (conveying) direction, the lifting of the pallet is ensured by blades 73 arranged at a height somewhat superior to groove 54 of the pallet resting on the conveyer belts. Slide 71 is displaceably disposed in clamping block 50a. Its drive is carried out via a (non-illustrated) driving means, e.g. a compressed air cylinder moving the slide towards the pallet 28. If the slide 71 is advanced, the tip of the positioning pin 55a projecting out of the slide, first penetrates into the end of groove 63a, whereby, due to the spring means 72, the positioning pin is firmly urged against the groove opening. Only when the slide 71 is further advanced, the blades 73 come into contact with the walls of V-groove 54 in order to lift and clamp the pallet which is meanwhile positioned accurately.

On the side opposite to the active clamping block 50a, a passive clamping block 50b acts as a counterhold, said clamping block 50b secured to profile 25 comprising a V-shaped rigid blade 55b adapted to penetrate into the lateral V-groove of pallet 54. The inlet side of blade 55b comprises a sloped plane 74. The blade 55b is situated at the same height as the opposite blades 73 so that the pallet being compressed between blades 73 and 55b, is lifted simultaneously by the conveyer belts 40, 41.

As further evident from FIG. 9, the external ends of grooves 62,62a,63 and 73a are funnel-shaped enlargements whose angle corresponds to that of the centering pin 55a.

FIGS. 10 and 11 show the construction of the turning station 70 at which a pallet 28 may be turned in both senses by 90° so that the edge presently situated ahead in conveying direction, will subsequently form a lateral edge. At the turning station 70, there is a plug 57 for arresting the pallet which is transported on the conveyer belts 40, 41. If the front edge of the pallet abuts against plug 57, the pallet 28 is centrally situated above the lifting means 76 provided in the interspace between the two conveyer belts 40, 41. Said lifting means 76 consists of a disk or star 77 secured to the upper end of a shaft 78 adapted to be lifted and lowered, said star 77 being provided with four arms extending in opposite directions and carrying each an upright plug 78, 78a,79,79a. Plugs 78 and 79 are offset mutually just in the same way as grooves 62 and 36 at the underside of pallet 28, and plugs 78a and 79a are mutually offset with respect to the transverse axis of star 77 in the same way as grooves 62a and 63a. If star 77 is lifted, each of the plugs 78,78a,79,79a penetrates into one of the grooves 62,62a,63,63a at the underside of the pallet 28. Although each plug is movable in longitudinal direction of the associated groove, the pallet 28 is nevertheless held immovable in a defined position by the four stated plugs. Hence, the same grooves cooperating with the bolts 57 of the arresting means, are also utilized for the turning device. Plugs 78, 78a,79,79a engage the inner ends of the grooves 62,62a,63,63a where said grooves end in the recess 60 of pallet 28. At that point, said grooves are limited by signal strips 67 made of hard material to eliminate the risk of wear or enlargement of the grooves due to the plugs of the lifting means.

If a lifting means has been set against the underside of an arrested pallet such as disclosed above, and the pallet has been centered by the plugs of the lifting means, the pallet is subsequently turned into the desired direction, while the lifting means 76 is turned about the axis of the vertical shaft 78 (FIG. 11.) Said rotation may be either made by 90° or by 180° in two directions. Upon the rotation, the lifting means 76 is lowered again, while the pallet is placed again on the conveyer belts 40, 41. Due to the disclosed arrangement of the plugs at the lifting means 76 in connection with the arrangement of the grooves at the underside of the pallet, such as described on the basis of FIG. 6, the lifting means 76 may be reutilized immediately in the way in which it was lowered, for now lifting a new pallet, in other words, the lifting means need not be turned back. Since the lifting means may accept the next pallet in the same rotary position in which the preceding pallet has been put down, time is saved and control is simplified.

Recess 60 in the pallet center may be used to fix to the pallet a workpiece take-up. It is accurately machined so that workpiece take-ups of all pallets circulating in a manufacturing plant are exactly fixed thus doing away with guide pins. On the other hand, workpieces may be also worked from below through the recess 60. The lifting of workpieces from the pallets from below for specific operations is facilitated. Last off, the recess permits to safely fix on the pallet such workpieces which comprise downwardly projecting elements which may extend into the recess 60.

The invention is not restricted to duplex belt conveyers. The conveyor units which are belts in the disclosed embodiment, may also consist of driven or non-driven rolls, and, to this effect, a plurality of rolls supporting the edges of pallet 28 are supported by each of the profiles 25, 26.

What is claimed is:

1. A conveyor particularly adapted for manufacturing installations comprising two generally parallel longitudinal profiles adapted to support a conveyor, each profile including an upright stem defining inner and outer sides, a leg projecting generally transversely from the inner side of each upright stem and carrying a vertical clamping bar, said profiles being disposed with the legs thereof projecting toward each other, said legs being adapted to support thereupon a conveyor, a retaining strip projecting generally transversely from the outer side of each upright stem, each retaining strip in part defining a longitudinal groove, each retaining strip having an exterior longitudinally extending inclined surface disposed in inclined relationship to a longitudinal plane of its associated upright stem, a clamping block carried by at least one of said retaining strips, and locking means carried by said clamping block for bearing against said inclined surface for selectively securing said clamping block to said one retaining strip.

2. A conveyor particularly adapted for manufacturing installations comprising two generally parallel longitudinal profiles adapted to support a conveyor, each profile including an upright stem defining inner and outer sides, a leg projecting generally transversely from the inner side of each upright stem and carrying a vertical clamping bar, said profiles being disposed with the legs thereof projecting toward each other, said legs being adapted to support thereupon a conveyor, a retaining strip projecting generally transversely from the outer side of each upright stem, a clamping bar projecting generally transversely from the inner side of each upright stem, means for clamping a transverse rail to said clamping bars and means carried by said transverse rail for manipulating a conveyor supported upon said transversely projecting legs.

3. A conveyor particularly adapted for manufacturing installations comprising two generally parallel longitudinal profiles adapted to support a conveyor, each profile including an upright stem defining inner and outer sides, a leg projecting generally transversely from the inner side of each upright stem and carrying a vertical clamping bar, said profiles being disposed with the legs thereof projecting toward each other, said legs being adapted to support thereupon a conveyor, a retaining strip projecting generally transversely from the outer side of each upright stem, said conveyor including a conveyor belt having a conveyor run in sliding relationship on each of said transversely projecting legs, and each vertical clamping bar projects downwardly.

4. The conveyor as defined in claim 1 wherein said conveyor supports pallets each having laterally oppositely opening grooves, at least one further clamping block carried by the other of said retaining strips, and said clamping blocks each having means cooperative with an associated one of said pallet grooves for lifting said pallets and thereby prevent movement thereof by said conveyor.

5. The conveyor as defined in claim 1 wherein each vertical clamping bar projects vertically upwardly.

6. The conveyor as defined in claim 1 wherein said leg and retaining strip of each upright stem include a generally common horizontal plane.

7. The conveyor as defined in claim 1 wherein each said retaining strip longitudinal groove opens in a generally upward direction.

8. The conveyor as defined in claim 1 wherein each upright stem has an upper terminal end portion projecting above its associated transversely projecting leg and said conveyor includes a pair of conveyor belts each having an upper conveyor run slidably supported upon an upper surface of an associated transversely projecting leg.

9. The conveyor as defined in claim 1 wherein said conveyor supports pallets each having laterally oppositely openings grooves, at least one further clamping block carried by the other of said retaining strips, and said clamping blocks each having means cooperative with an associated one of said pallet grooves for yieldingly entering said grooves to accurately locate said pallets in the direction of pallet movement.

10. The conveyor as defined in claim 1 wherein said conveyor supports pallets each having laterally oppositely opening grooves, at least one further clamping block carried by the other of said retaining strips, and said clamping blocks each having means cooperative with an associated one of said pallet grooves for yieldingly entering said grooves to accurately locate said pallets in the direction of pallet movement, and at least one of said clamping blocks having means cooperative with an associated one of said pallet grooves for lifting said pallets and thereby prevent movement thereof by said conveyor.

11. The conveyor as defined in claim 5 wherein said leg and retaining strip of each upright stem include a generally common horizontal plane.

12. The conveyor as defined in claim 5 wherein each said retaining strip longitudinal groove opens in a generally upward direction.

13. The conveyor as defined in claim 5 wherein each upright stem has an upper terminal end portion projecting above its associated transversely projecting leg and said conveyor includes a pair of conveyor belts each having an upper conveyor run slidably supported upon an upper surface of an associated transversely projecting leg.

14. The conveyor as defined in claim 11 wherein each said retaining strip longitudinal groove opens in a generally upward direction.

15. The conveyor as defined in claim 11 wherein each upright stem has an upper terminal end portion projecting above its associated transversely projecting leg and said conveyor includes a pair of conveyor belts each having an upper conveyor run slidably supported upon an upper surface of an associated transversely projecting leg.

16. The conveyor as defined in claim 14 wherein each upright stem has an upper terminal end portion projecting above its associated transversely projecting leg and said conveyor includes a pair of conveyor belts each having an upper conveyor run slidably supported upon an upper surface of an associated transversely projecting leg.

* * * * *